United States Patent [19]
Aucsmith

[11] Patent Number: 6,148,407
[45] Date of Patent: Nov. 14, 2000

[54] METHOD AND APPARATUS FOR PRODUCING COMPUTER PLATFORM FINGERPRINTS

[75] Inventor: David Aucsmith, Portland, Oreg.

[73] Assignee: Intel Corporation, Santa Clara, Calif.

[21] Appl. No.: 08/941,146

[22] Filed: Sep. 30, 1997

[51] Int. Cl.[7] .................................................. H04L 9/00
[52] U.S. Cl. ............................................................ 713/202
[58] Field of Search ............................ 380/4, 23; 382/124, 382/125; 713/200, 202

[56] References Cited

U.S. PATENT DOCUMENTS

| | | | |
|---|---|---|---|
| 5,337,357 | 8/1994 | Chou et al. ................................. | 380/4 |
| 5,815,709 | 9/1998 | Waldo et al. ............................ | 709/303 |
| 5,920,628 | 7/1999 | Indeck et al. .............................. | 380/23 |
| 5,933,516 | 8/1999 | Tu et al. ................................. | 382/125 |

*Primary Examiner*—Tod R. Swann
*Assistant Examiner*—Matthew Smithers
*Attorney, Agent, or Firm*—Jeffrey S. Draeger

[57] ABSTRACT

A method and apparatus for computer platform identification. According to the method, a first fingerprint is generated using a plurality of computer system traits. A second fingerprint is generated on an unidentified computer and then compared to the first fingerprint. This comparison results in a value representing a probability that the unidentified computer system is the same computer system which generated the first fingerprint. A system disclosed includes a processor which is coupled to memory by a bus. The memory contains a first routine which retrieves a plurality of system traits to form a first fingerprint. The memory also contains a second routine which retrieves the first fingerprint and compares the first fingerprint to a second fingerprint.

30 Claims, 6 Drawing Sheets

6,148,407

METHOD AND APPARATUS FOR PRODUCING COMPUTER PLATFORM FINGERPRINTS

FIELD OF THE INVENTION

The present invention pertains to the field of computer and digital information processing systems. More specifically, the present invention relates to identification of such systems.

BACKGROUND

Presently, no unique and universally accepted identification string exists in the personal computer (PC) platform. As a result, there is presently no adequate way to uniquely or somewhat uniquely identify the computer. This shortcoming remains despite the numerous existing applications which could benefit from such an identifier. For example, remote access providers could offer improved security if each connected machine could be positively identified. Software copy protection could also be improved by identifying the host machine executing the software and preventing execution on other machines.

Additionally, other applications may indeed require such an identification. Forthcoming applications which provide the use of audio, video, or other data on a restricted basis may require platform or user identification which can not easily be defeated. For example, if an information or content provider wishes to authorize usage for only one user, or wishes to charge based on the number of uses of a particular compilation, some reliable mechanism must be used ensure access is properly limited.

Present systems may utilize some form of password protection to provide analogous security mechanisms. Such mechanisms, however, require user intervention and may be cumbersome and/or easily circumvented. Currently no sufficiently unique machine identifier exists absent user interaction.

The use of any single component identifier (e.g., manufacturer, model, and/or performance traits) is problematic for a number of reasons. First, component identifiers, such as Ethernet addresses, are not universally available in every platform. Second, such component identifiers are generally not unique. For example, BIOS (Basic Input/Output Software) identifications are neither unique nor universally available. Additionally, the use of a single identifier, such as a central processing unit identification (CPUID) may prove problematic when the system is upgraded. Any such scheme relying on a single component identifier will fail if the component is replaced with a higher performance component as is routinely done in the process of upgrading.

Thus, the prior art fails to provide a secure platform identification scheme which is generally available, reasonably unique, and immune to normal upgrading. A reasonably unique identifier which allows a user to upgrade the platform without destroying the identification of the platform and which can be generated regardless of the configuration and components of the machine could enable new applications and improve many which already exist.

SUMMARY

A method and apparatus for computer platform identification is described. According to the method, a first fingerprint is generated using a plurality of computer system traits. A second fingerprint is generated on an unidentified computer and then compared to the first fingerprint. This comparison results in a value representing a probability that the unidentified computer system is the same computer system which generated the first fingerprint.

A system of the present invention includes a processor which is coupled to memory by a bus. The memory contains a first routine which retrieves a plurality of system traits to form a first fingerprint. The memory also contains a second routine which retrieves the first fingerprint and compares the first fingerprint to a second fingerprint.

BRIEF DESCRIPTION OF THE FIGURES

The present invention is illustrated by way of example and not limitation in the figures of the accompanying drawings.

DETAILED DESCRIPTION

The present invention provides a method and apparatus for producing and verifying computer platform fingerprints. In the following description, numerous specific details such as particular computer components, performance characteristics, user selected preferences, and mathematical relationships are set forth in order to provide a more thorough understanding of the present invention. It will be appreciated, however, by one skilled in the art that the invention may be practiced without such specific details.

The present invention generates a multiple component platform identification and then probabilistically tests whether the platform is the same one that generated a previously stored identification. This "fingerprinting" process provides a reasonably unique identification that accommodates platform upgrades occurring during the platform's lifetime. Furthermore, the identification process may provide security against intentionally falsified identifications by eliminating user input, incorporating difficult to change attributes in the fingerprint, and encrypting the fingerprint to prevent alteration.

Figure 1:
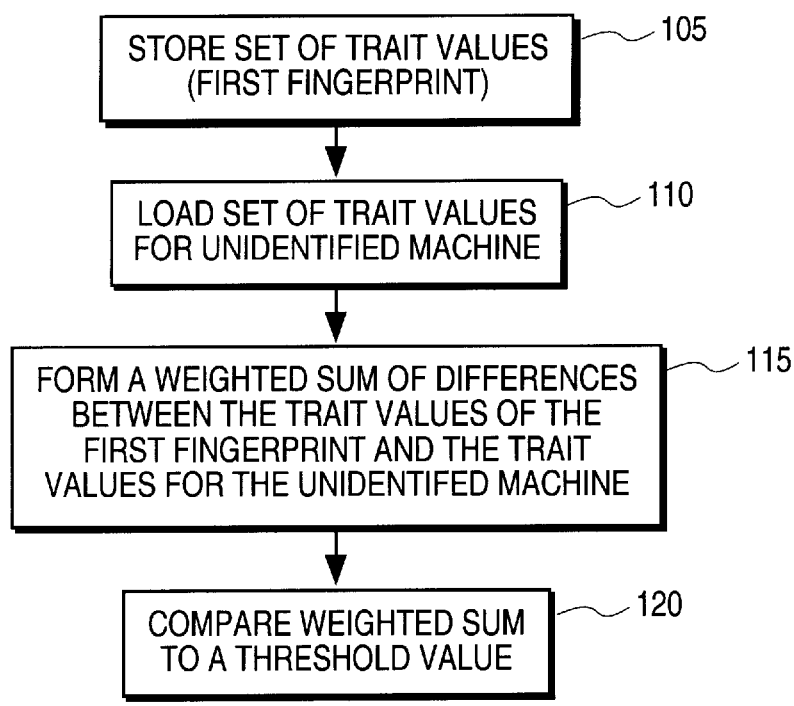
FIG. 1 illustrates one embodiment of a method of the present invention.

FIG. 1 illustrates a flowchart of a basic identification process performed according to present invention. Further details and alternate embodiments are discussed with respect to the remaining figures. In step 105, a first fingerprint is formed by storing a set of trait values, typically in a non-volatile storage device. The trait values represent a set of characteristics, preferences, or qualities in the computer system which may or may not be subject to change throughout the life of the computer system. With the first fingerprint stored (preferably in a secure manner so it may not be tampered with), subsequent applications or subsequent invocations of the same application can compare a fingerprint generated at the time of invocation to the stored fingerprint.

A program desiring to identify its host platform is initially deemed to be executing on an unidentified machine because no identity checks have yet been performed. As shown in step 110, a set of trait values are loaded or sampled for the unidentified machine. Next, as illustrated in step 115, the trait values of the first fingerprint are compared to the trait values loaded in step 110. A weighted sum of the differences is formed to indicate the probability that the unidentified machine is the same machine that formed the first (stored) fingerprint. As will be further discussed below, the weights and mathematical functions applied to the differences in the fingerprints depend on the types of traits and the likelihood of change in those traits.

The application then typically compares the weighted sum to a threshold value as shown in step 120. The application may choose its threshold depending on the level of certainty of identification required. In this manner, software may positively identify that it is operating on the proper machine, and/or information or media usage may be billed to the proper user. Additionally, such machine identification may be useful in such applications as verifying the identity of dial in users, resulting in improved protection against destructive use of computer systems (i.e., hacking).

Figure 2:
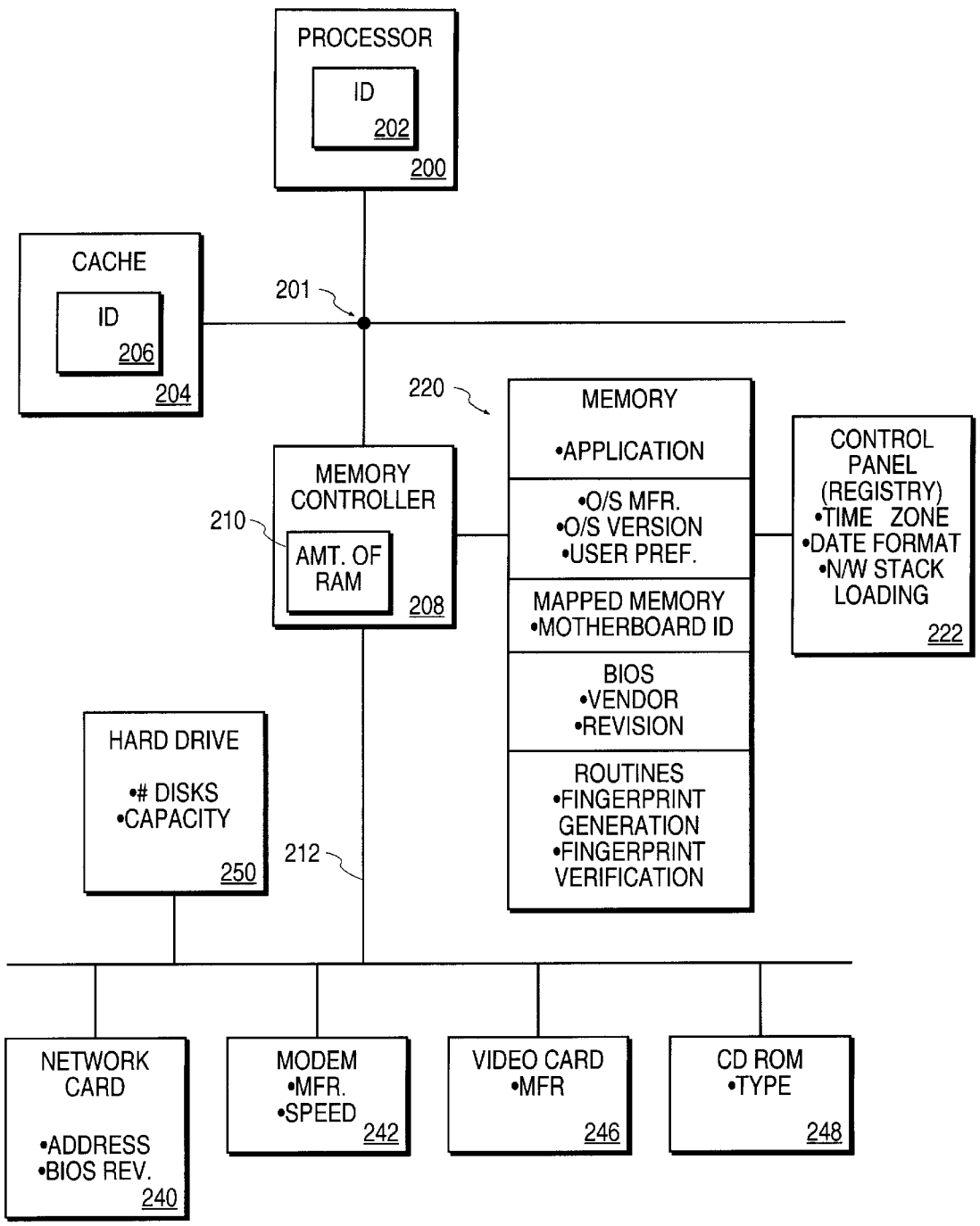
FIG. 2 illustrates one embodiment of a computer system of the present invention.

FIG. 2 illustrates one embodiment of a computer system utilizing identification techniques of the present invention. The identification process, however, may be used in other computing devices having a different numbers and types of components and/or different arrangements thereof. For example, other embodiments of the present invention perform digital audio or video processing, distribution, reception, or transmission.

The system of FIG. 2 includes a processor 200 which is coupled by a bus 201 to a cache 204 and a memory controller 208. The memory controller is coupled to a memory 220 and provides a bridge to a secondary bus 212. The secondary bus hosts a number of devices, including a hard drive 250, a network card 240, a modem 242, a video card 246, and a CD ROM 248. In other embodiments, these components may reside on more or different bus structures, and some of such components may be entirely absent. The fingerprint is based on values available from components (including software) which are actually present in the system.

Figure 3:
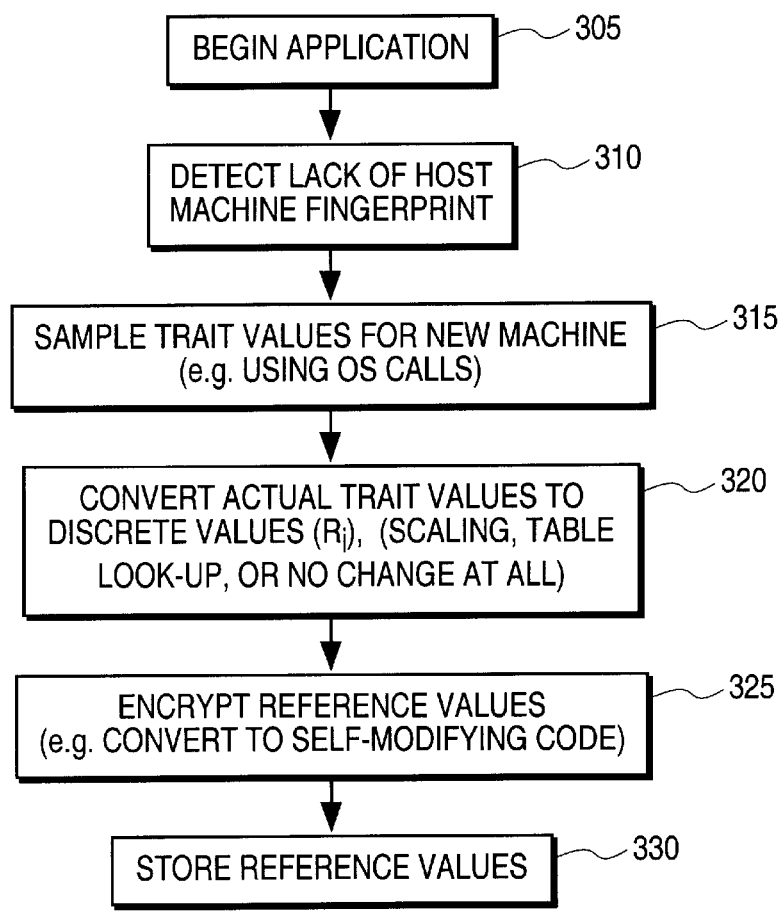
FIG. 3 illustrates one embodiment of a method of generating a computer system fingerprint according to the present invention.

The system shown in FIG. 2 generates a first fingerprint according to the process shown in FIG. 3 when the processor 200 executes the fingerprint generation routine in memory 220. The fingerprint identification routine is called by an application, begun in step 305, which uses the system identification feature. The first time this application is executed, it detects the lack of a host machine fingerprint as shown in step 310. A host machine fingerprint may be necessary not only for individual applications, but also for individual data compilations (e.g., audio, video, or other information) if only limited usage of such compilations is allowed. Any application or data compilation requiring system identification may be referred to herein as a "program".

The host machine samples trait values for the new machine as shown in step 315. The machine is "new" in the sense that this program has not yet been accessed by the machine. The application may use standard operating system (OS) calls or any other known method of retrieving system characteristics to ascertain certain traits needed to form the system fingerprint.

A number of system traits are readily available in the system of FIG. 2. These traits include not only hardware attributes such as manufacturer and performance characteristics, but also software versions and user preferences. For example, the processor 200 includes a processor ID 202. The cache 204 may similarly contain a cache ID 206 which may either designate the cache model or size. The memory controller 208 includes at least one register 210 indicating the amount of RAM in the system.

Similarly, the peripheral components have characteristics which the OS can detect. The hard drive 250 may have a designation of the number of disks or the capacity of those disks. The network card 240 has an address (e.g., an Ethernet address) and a BIOS revision. The modem 242 has a manufacturer ID and a baud rate (speed). Likewise, the video card 246 may have a designation of the manufacturer and the CD ROM 248 may have a register storing the CD ROM type. Some less complex components may not have accessible identifiers, thus only a subset of the total components may be used for the fingerprinting process.

The memory 220 also contains numerous sources of traits which can be incorporated into the fingerprint. Notably, many of these items are at times stored on the hard disk drive and thus are often only temporarily resident in volatile memory. For example user preferences are typically stored on the hard drive but will also at times be resident in volatile memory. Thus, memory based traits include traits stored in volatile memory and non-volatile memory such as ROMs, disk drive storage, and memory mapped I/O locations.

Specific memory based traits which may be useful in forming a system fingerprint include the OS manufacturer, the OS version, and the preferences selected for use with the operating system or with application programs. In particular, in a Microsoft Windows® operating system, information from the control panel 222 and the registry, including the time zone, the time format, the network stack loading, etc., may all be incorporated into a system fingerprint. Additionally, memory mapped information such as a motherboard identification as well as information regarding the system BIOS vendor and revision number may also be included.

After the desired traits are sampled in step 315, it may be advantageous to convert the actual values sampled into discrete values as shown in step 320. For example, it may be advantageous to scale a revision number, normalizing the value to an expected range of revisions which may be encountered over the lifetime of the system. On the other and, changes in some traits such as modem manufacturer are unlikely to have any mathematical correspondence. For such traits, a table look up or an arbitrary assignment may be used to substitute a numerical value for the actual trait value returned by the operating system. Finally, some traits may have acceptable values such that no action is required to convert the actual trait value to the discrete value which is stored in the fingerprint generation process. In any case, discrete reference values $R_i$, are generated for the traits included in the template fingerprint.

Although encryption of the reference values is not required for the present invention, many applications can enhance security by encrypting these values as indicated in step 325. Absent such encryption, the stored values may be located and altered by a user seeking to circumvent the fingerprint identification. This could allow duplication or unauthorized usage of works. One technique of encrypting the reference values is to convert the values into a string of self modifying code.

Figure 4:
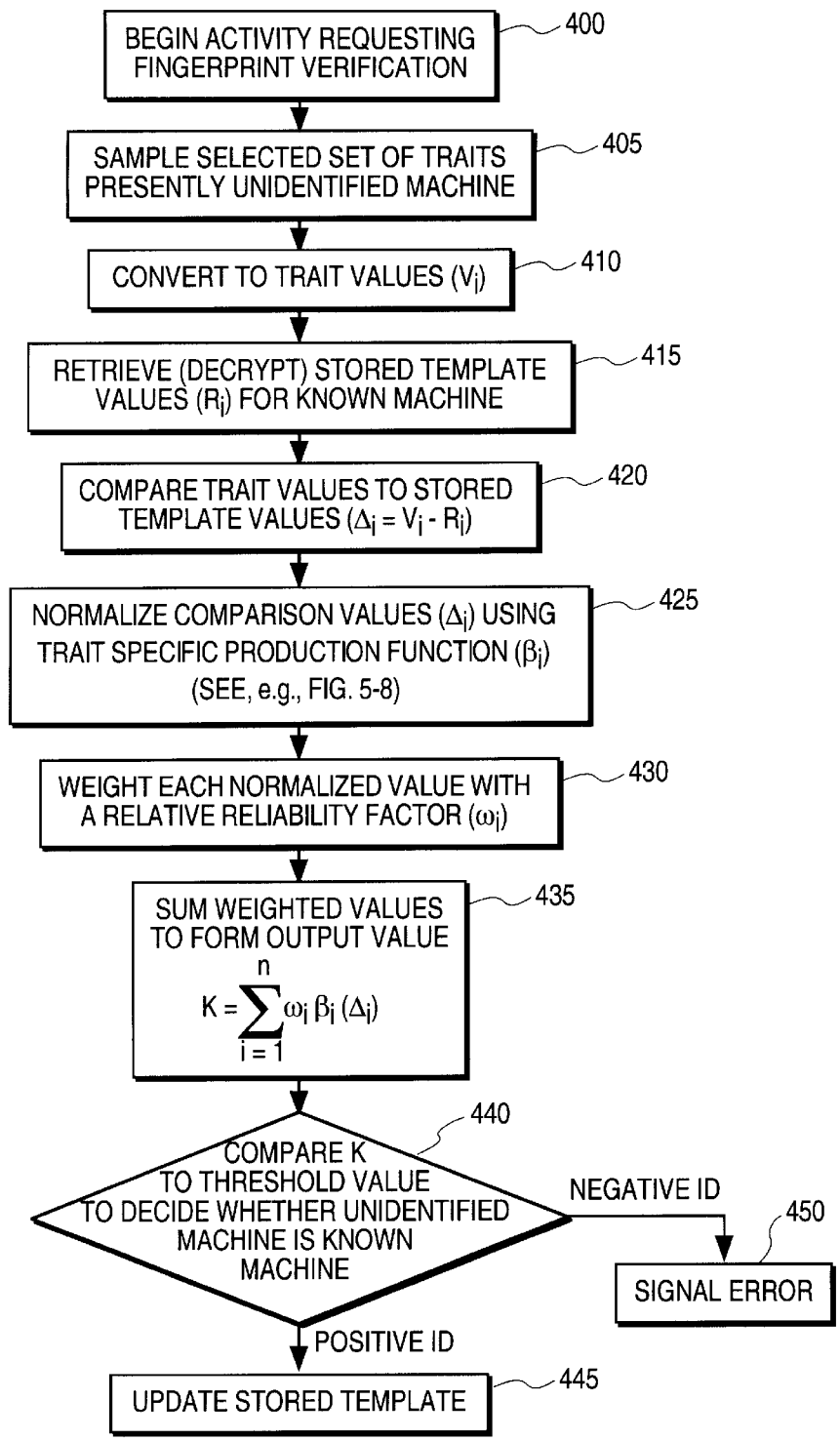
FIG. 4 illustrates one embodiment of a method of verifying a computer system fingerprint according to the present invention.

Finally, the reference values, which are typically encrypted at this point, are stored by the application as shown in step 330. The reference values are available to any subsequent application which understands the encryption technique and the storage location. This initial identification (fingerprint generation) procedure may suffice to commence execution of a program on a "new" system, or the system may also proceed to verify the fingerprint according to the process in FIG. 4.

Verification begins in step 400 when an activity (i.e., some type of program having access rules or restrictions) requests fingerprint verification because the system attempting to invoke the program has not yet been adequately identified. The selected set of traits which define the fingerprint are sampled as shown in step 405. In step 410, the actual trait values are converted into discrete trait values $V_i$ in the same manner as discussed with respect to step 320.

Next, as shown in step 415, the reference values are retrieved and decrypted to produce the stored template or reference values $R_i$ which represent the fingerprint of a known or authorized machine. Notably, in an alternate embodiment, the conversion for the reference values $R_i$ (step 320 in FIG. 3) is performed when the reference values are retrieved from storage in step 415. This eliminates the need for step 320 which performs the conversion prior to storage.

In either case, the newly sampled trait values $V_i$ are compared to the stored template values $R_1$ as shown in step 420. In one embodiment, the comparison is a subtraction to form a set comparison values, $\Delta_i = V_i - R_i$. The comparison values are then normalized using a trait specific prediction function $\beta_i$ as indicated in step 425. The trait specific prediction function determines the probability that trait i as measured in $V_i$ is from the same system as that which derived $R_i$. Various trait specific prediction functions are shown in FIGS. 5–8.

Figure 5:
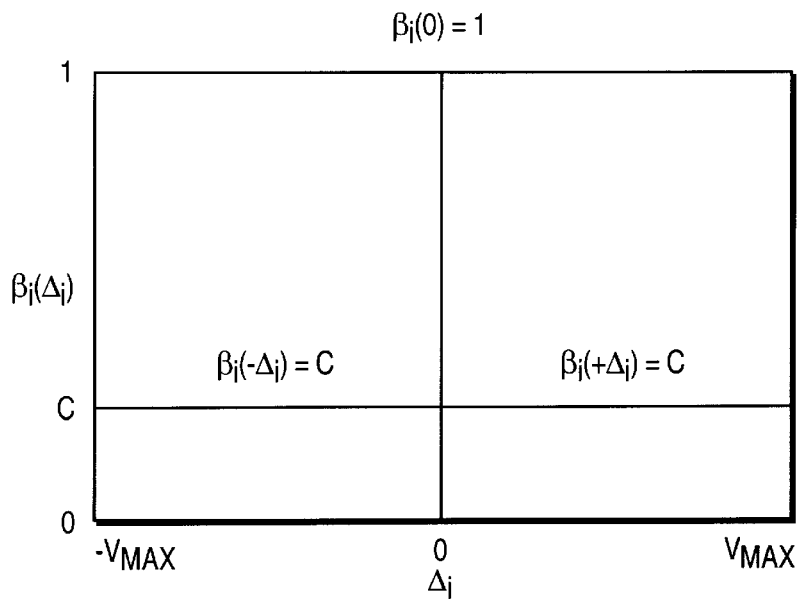
FIG. 5 illustrates a prediction function for a constant trait.

FIG. 5 illustrates a first type of trait specific prediction function $\beta_i$ which may be used with a class of traits referred to as constant traits. A constant trait is a trait such as the cache identifier or motherboard type which is not likely to change during the life of the system. For traits in the constant traits class, all non-zero $\Delta_i$ values are equally likely, whereas $\Delta_i$ being zero is extremely likely. Thus, the three HI functions are:

$Y_i = \beta_i (=\Delta_i) = C$,
$Y_i = \beta_i (0) = 1$, and
$Y_i = \beta_i (\Delta_i) = C$, where C is some small constant and 1 is the highest prediction function value. While C may be varied with the probability of each particular constant trait changing, that likelihood does remain low, typically less than half the highest prediction function value of one.

Figure 6:
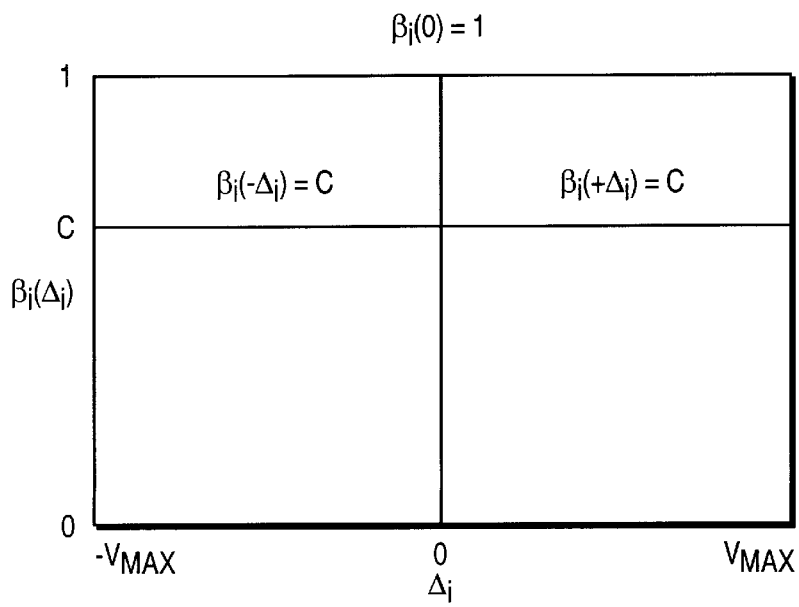
FIG. 6 illustrates a prediction function for a membership trait.

The next class, the class of membership traits, is identical to the class of constant traits, except that the constant value C is larger, typically greater than one-half. A graph of the prediction function for membership traits is illustrated in FIG. 6, and the equations describing the graph are the same as those for constant traits. Membership traits include traits such as modem manufacturer, BIOS manufacturer, OS manufacturer, network card address, video card manufacturer, time zone setting, and CD ROM type. These traits are more likely to change than the constant traits; however, no new value is significantly more probable than another, so a constant prediction function is again used.

Figure 7:
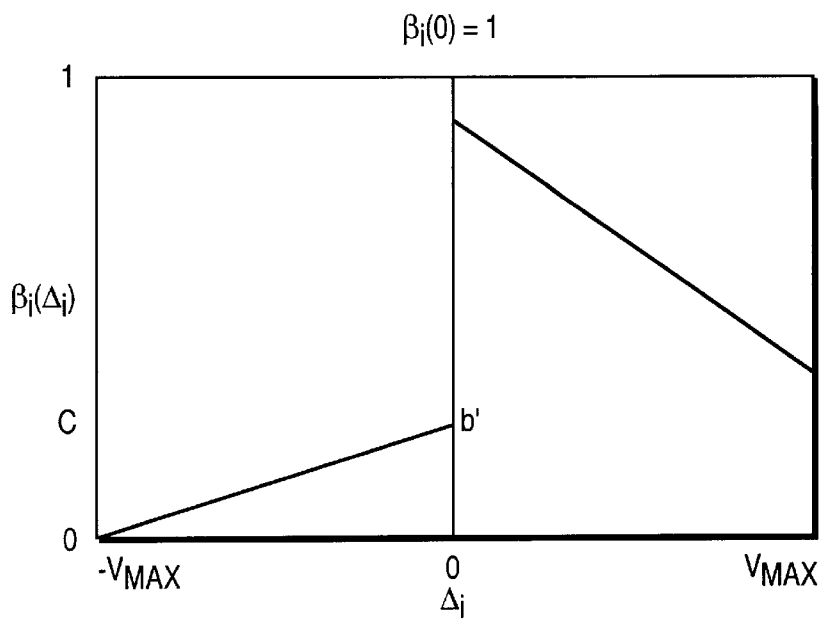
FIG. 7 illustrates a prediction function for a revision trait.

A graph of the prediction function for a third class of traits, revision traits, is illustrated in FIG. 7. Revision traits operate on the assumptions that upgrades increase revision numbers, and that revision numbers are not likely to increase substantially. Accordingly, if $\Delta_i$ is negative, then $\beta_i$ is initially low and decreases further as $\Delta_i$ becomes a larger negative number. If $\Delta_i$ is positive, then $\beta_i$ is initially high and decreases as $\Delta_i$ becomes a larger positive number. Thus, the $\Delta_i$ equations for membership traits are:

$y_i = \beta_i (-\Delta_i) = m'\Delta_i + b'$,
$y_i = \beta_i (0) = 1$, and
$y_i = \beta_i (\Delta_i) = -m\Delta_i + b$, where m, m', b, and b' are constants which may be varied for different traits. As illustrated, the prediction function for negative $\Delta_i$ generally increases from its lowest value at $-V_{max}$ to a value of less than one-half. The prediction function for positive $\Delta_i$ generally decreases from a high value near zero to a value near one-half at $V_{max}$.

Figure 8:
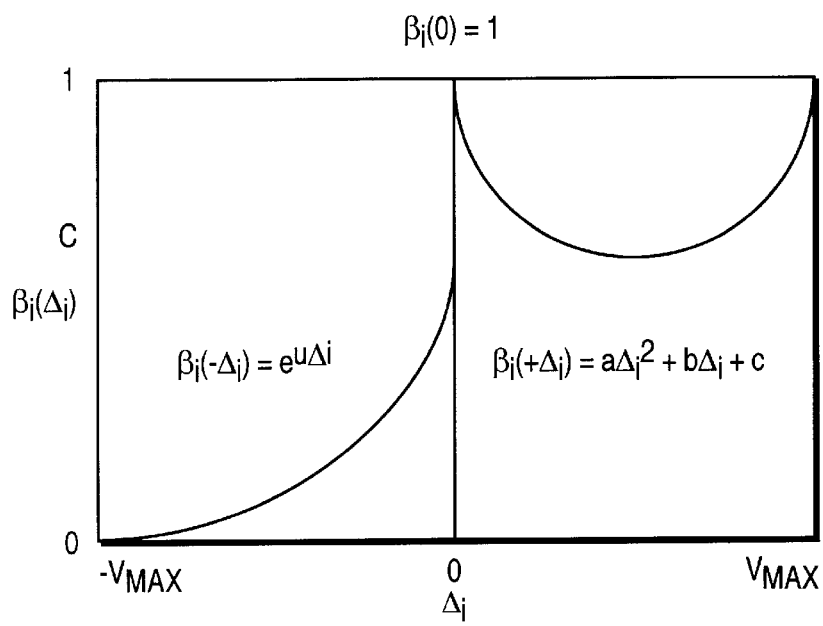
FIG. 8 illustrates a prediction function for a performance trait.

The prediction function for a fourth class of traits, performance traits, is illustrated in FIG. 8. Performance traits are similar to revision traits except that changes are likely to be larger. Thus, the prediction functions for performance traits reflect the assumption that performance increases are generally significant positive changes. Accordingly, if $\Delta_i$ is negative, then $\beta_i$ is initially low and decreases even more as $\Delta_i$ becomes a larger negative number. If $\Delta_i$ is positive, then $\beta_i$ is initially high and decreases as $\Delta_i$ increases; however, $\beta_i$ reaches a point where it again increases, forming a parabolic curve. The prediction function equations for membership traits are:

$y_i = \beta_i (\Delta_i) = e^{-u\Delta i}$,
$y_i = \beta_i (0) = 1$, and
$y_i = \beta_i (-\Delta_i) = a\Delta_i^2 + b\Delta_i + c$, where a, b, c, and u are constants which may very by trait.

After application of the prediction function, each value is weighted with a relative reliability factor (, as shown in step 430. This reliability factor indicates the relative reliability of one trait against another in predicting an accurate identification. Assuming n traits, $$\sum_{i=1}^{n} \omega i = 1.$$

The reliability factor is generally determined by analysis of the particular trait and by empirical study of its behavior relative to the other traits chosen.

A comparator output K is then formed as shown in step 435 using the equation $$K = \sum_{i=1}^{n} \omega i \cdot \beta i(\Delta i).$$

The summation is typically performed gradually as the weighted values are generated by the comparing, normalizing, and weighting processes. Alternately, the set of weighted values can be individually generated and all summed at once.

The comparator value K is then subjected to the application's threshold value as shown in step 440. If the application is satisfied that a positive identification has occurred, the stored template values $R_i$ are updated to the sampled values $V_i$ as shown in step 445 (i.e., steps 325–330 are performed using $V_i$) This allows the system characteristics to drift over time, accommodating normal upgrades and/or changes to the system. If the application regards the K value as too low, an error is indicated as shown in step 450 signaling that an unauthorized attempt to invoke a program has occurred. In one embodiment, the appropriate software routines may be bound to the application as a DLL file used in a Windows® operating system.

Thus, the method and apparatus of the present invention provides a technique of generating and verifying computer platform fingerprints. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of identifying a computer system comprising the steps of:
   generating a first fingerprint for a first computer system using a plurality of computer system traits;
   generating a second fingerprint for an unidentified computer system using said plurality of computer system traits; and
   comparing said first fingerprint and said second fingerprint to determine a value representing a probability that said unidentified computer system is said first computer system.

2. The method of claim 1 further comprising, before the step of generating said second fingerprint, the steps of:
   storing said first fingerprint;
   beginning an activity requiring fingerprint verification; and
   retrieving said first fingerprint.

3. The method of claim 2 wherein the step of storing further comprises the steps of:
   encrypting said first fingerprint to form an encrypted fingerprint; and
   writing said first fingerprint to a non-volatile storage device.

4. The method of claim 3 wherein the step of comparing further comprises the steps of:
   generating a weighted sum of differences between a plurality of corresponding values comprising said first fingerprint and said second fingerprint; and
   comparing said weighted sum to a threshold value.

5. The method of claim 3 wherein said step of generating said first fingerprint further comprises:
   sampling at least one of a constant trait, a membership trait, a revision trait, and a performance trait.

6. The method of claim 1 wherein said step of comparing further comprises the steps of:
   assigning a highest prediction function value if a trait value in said first fingerprint equals said trait value in said second fingerprint; and
   using said highest prediction function value in determining said value representing said probability that said unidentified computer system is said first computer system.

7. The method of claim 1 wherein said step of comparing further comprises the step of:
   applying a plurality of prediction functions to a plurality of differences between a plurality of traits in said first fingerprint and a plurality of corresponding traits in said second fingerprint.

8. The method of claim 7 wherein said step of applying further comprises the step of using a plurality of prediction equation classes, each of said plurality of prediction equation classes having at least one parameter which varies based on which trait is being compared.

9. The method of claim 1 wherein said step of comparing further comprises the steps of:
   assigning a prediction function value which is less than half a highest prediction function value if a value representing a trait in said first fingerprint is not equal to a corresponding value in said second fingerprint and said trait is a constant trait; and
   using said prediction function value in determining said value representing said probability that said unidentified computer system is said first computer system.

10. The method of claim 1 wherein said step of comparing further comprises the steps of:
    assigning a prediction function value that is greater than one half a highest prediction function value if a value representing a trait in said first fingerprint is not equal to a corresponding value in said second fingerprint and said trait is a membership trait; and
    using said prediction function value in determining said value representing said probability that said unidentified computer system is said first computer system.

11. The method of claim 1 wherein said step of comparing further comprises the steps of:
    assigning a prediction function value that is linearly increasing to a value of less than one half a highest prediction function value if a value representing a trait in said first fingerprint is less than a corresponding value in said second fingerprint and said trait is a revision trait;
    assigning a prediction function value that linearly decreasing to approximately one half said highest prediction function value if said value representing said trait in said first fingerprint is greater than said corresponding value in said second fingerprint and said trait is a revision trait; and
    using said prediction function value in determining said value representing said probability that said unidentified computer system is said first computer system.

12. The method of claim 1 wherein said step of comparing further comprises the steps of:
    assigning a prediction function value that is exponentially increasing to a value of approximately one half a highest prediction function value if a value representing a trait in said first fingerprint is less than a corresponding value in said second fingerprint and said trait is a performance trait;
    assigning a prediction function value that forms a parabolic function having endpoints greater than one half said highest prediction function value if said value representing said trait in said first fingerprint is greater than said corresponding value in said second fingerprint and said trait is a performance trait; and
    using said prediction function value in determining said value representing said probability that said unidentified computer system is said first computer system.

13. A method of identifying an unidentified computer system comprising the steps of:
    sampling a plurality of trait values of said unidentified computer system;
    comparing said plurality of trait values with a plurality of template values from a known computer system to generate a comparator output value; and
    deciding whether said unidentified computer system is said known computer system by comparing the comparator output value to a threshold value.

14. The method of claim 13 wherein the step of comparing further comprises the steps of:

comparing said plurality of traits values with said plurality of template values to generate a plurality of comparison values;

weighting said plurality of comparison values using a plurality of weights.

15. The method of claim 14 wherein said step of weighting further comprises the steps of:

normalizing said plurality of comparison values using a trait specific prediction function to generate a plurality of normalized values; and weighting each of said plurality of normalized values with a relative reliability factor to generate a plurality of weighted values; and summing said plurality of weighted values to form said comparator output value.

16. The method of claim 15 wherein the step of summing further comprises the step of summing each of said plurality of weighted values as said plurality of weighted values are formed by the steps of comparing, normalizing, and weighting.

17. The method of claim 13 wherein the step of sampling further comprises the steps of:

determining a plurality of actual trait values; and converting said plurality of actual trait values to said plurality of trait values which are numeric trait values.

18. The method of claim 17 wherein the step of determining said plurality of actual trait values comprises the step of calling an operating system routine which tests a system characteristic to determine each actual trait value.

19. The method of claim 17 wherein the step of converting comprises the steps of:

scaling an ordered trait according to a monotonic function; and translating a non-ordered trait into a random discrete value.

20. The method of claim 13, further comprising the steps of:

indicating said unidentified computer system is said known computer system if said comparator output value is greater than said threshold value; and indicating said unidentified system is not said known computer system if said comparator output value is less than said threshold value.

21. A method of identifying a computer system comprising the steps of:

sampling a plurality of traits of an unidentified computer system, said plurality of traits being represented by a plurality of values $V_i$;

comparing said plurality of values $V_i$ with a plurality of stored template values $R_i$ to generate a plurality of comparison values $\Delta_i$;

normalizing said plurality of comparison values $\Delta_i$ using a trait specific prediction function $\beta_i$ to generate a plurality of normalized values $\beta_i(\Delta_i)$;

weighting each of said plurality of normalized values with a relative reliability factor $\omega_i$ to generate a plurality of weighted values $\omega_i \beta_i (\Delta_i)$;

summing said plurality of weighted values to form a comparator output value K; and deciding whether said unidentified computer system is a known computer system by comparing said comparator output value K to a threshold value.

22. A method of generating a computer fingerprint, comprising the steps of:

sampling a plurality of values representing computer system traits;

encrypting said plurality of values to form an encrypted fingerprint by generating a section of self modifying code storing said plurality of values in a first fingerprint representing computer system traits; and storing said encrypted fingerprint.

23. The method of claim 22 further comprising:

generating a second fingerprint for an unidentified computer system using said plurality of computer system traits;

decoding said encrypted fingerprint to recover said first fingerprint; and comparing said first fingerprint and said second fingerprint to determine a value representing a probability that said unidentified computer system generated said first fingerprint.

24. A method of comparing computer system fingerprints comprising the steps of:

retrieving a plurality of template values representing a known machine;

sampling a plurality of trait values representing a second machine; and summing a plurality of weighted prediction function values, each of said plurality of weighted prediction function values being a function of a difference between a corresponding member of said plurality of template values and said plurality of trait values.

25. A computer system comprising:

a processor;

a bus;

a memory coupled to said processor by said bus, said memory containing:

a first routine which, when executed by the processor, retrieves a plurality of system traits to form a first system fingerprint; and a second routine which, when executed by the processor, retrieves said first system fingerprint, forms a second system fingerprint, and compares said first system fingerprint and said second system fingerprint to develop a value representing a probability that said first system fingerprint matches said second system fingerprint.

26. The computer system of claim 25 further comprising:

a plurality of computer system components, a subset of said plurality of computer system components having an identifying trait, wherein said plurality of system traits retrieved by said first routine include said identifying trait of each of subset of said plurality of computer system components.

27. The computer system of claim 26 wherein said plurality of computer system components comprises:

a plurality of hardware components having a plurality of hardware traits forming a first portion of said plurality of system traits; and a plurality of software components having a plurality of software traits and a plurality of software preferences forming a second portion of said plurality of system traits.

28. An article comprising a machine readable medium that stores instructions which, when executed by a machine, cause the machine to perform operations comprising:

generating a first fingerprint for a first computer system using a plurality of computer system traits;

generating a second fingerprint for an unidentified computer system using said plurality of computer system traits; and comparing said first fingerprint and said second fingerprint to determine a value representing a probability that said unidentified computer system is said first computer system.

29. The article of claim 28 wherein the machine readable medium stores further instructions which, when executed by a machine, cause the machine to perform comparing operations comprising:

generating a weighted sum of differences between a plurality of corresponding values comprising said first fingerprint and said second fingerprint; and comparing said weighted sum to a threshold value.

30. The article of claim 28 wherein the machine readable medium stores further instructions which, when executed by a machine, cause the machine to perform comparing operations comprising:

applying a plurality of prediction functions to a plurality of differences between a plurality of traits in said first fingerprint and a plurality of corresponding traits in said second fingerprint.

* * * * *

UNITED STATES PATENT AND TRADEMARK OFFICE
CERTIFICATE OF CORRECTION

PATENT NO. : 6,148,407 Page 1 of 1
DATED : November 14, 2000
INVENTOR(S) : Aucsmith It is certified that error appears in the above-identified patent and that said Letters Patent is hereby corrected as shown below:

Column 4,
Line 47, delete "and", insert -- hand --.

Column 5,
Line 25, delete "$R_1$", insert -- $R_i$ --.
Line 43, delete "$(=\Delta_i)$", insert -- $(-\Delta_i)$ --.

Signed and Sealed this

Fifth Day of November, 2002

Attest:

Attesting Officer

JAMES E. ROGAN
*Director of the United States Patent and Trademark Office*